Oct. 19, 1971     L. D. HOWES     3,613,360

COMBUSTION CHAMBER CONSTRUCTION

Filed Oct. 30, 1969     2 Sheets-Sheet 1

INVENTOR.
LESLIE D. HOWES
BY
Herschel C. Onohundro
ATTORNEY

INVENTOR
LESLIE D. HOWES

Herschel C. Omohundro
ATTORNEY

United States Patent Office 3,613,360
Patented Oct. 19, 1971

3,613,360
COMBUSTION CHAMBER CONSTRUCTION
Leslie D. Howes, Phoenix, Ariz., assignor to The Garrett
Corporation, Los Angeles, Calif.
Filed Oct. 30, 1969, Ser. No. 872,628
Int. Cl. F02c 3/08; F23r 1/10
U.S. Cl. 60—39.36
12 Claims

ABSTRACT OF THE DISCLOSURE

The subject combustion chamber construction has an outer casing enclosing an inner casing to form an annular combustion chamber with an air plenum or passage extending along the outside, radially inwardly at the rear end, and axially along the inner side. Air from the engine compressor enters the plenum at the front end and flows through the passage into the combustion chamber through openings in the inner wall thereof, such air then flowing tangentially from the inner wall to form a toroidal flow pattern. Fuel is sprayed into combustion chamber from tangentially directed jets to mix and burn with the air in the toroidal flow pattern, the resulting gases discharging from the chamber via an annular radially inwardly directed nozzle adjacent the air inlet. The toroidal flow pattern in the annular chamber prolongs the air/fuel mixing and burning period.

BRIEF SUMMARY

Figure 1:
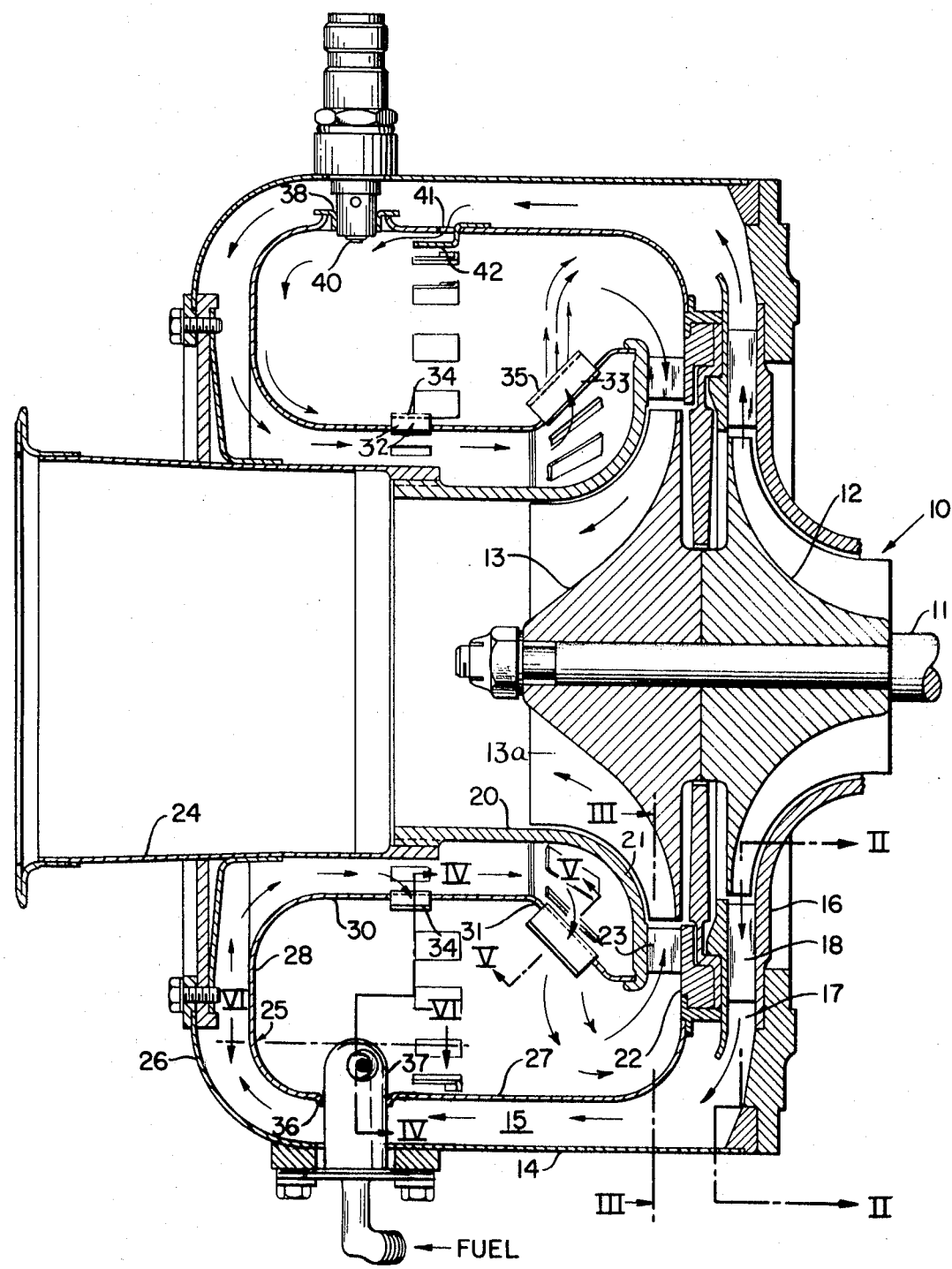
Figure 2:
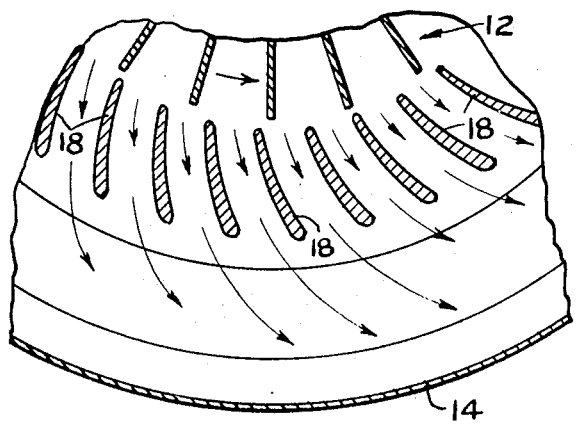
Figure 3:
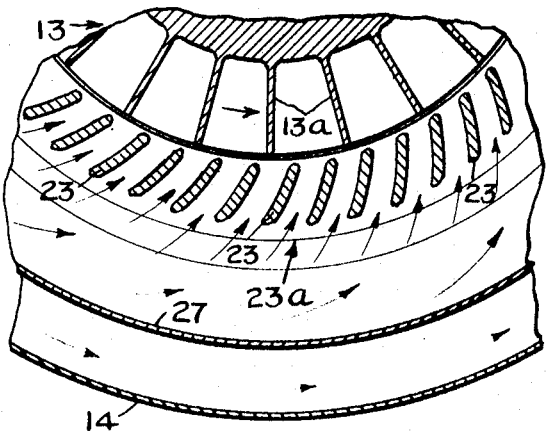

This invention relates generally to gas turbine engines of the type having coaxial compressor and turbine components. More particularly the invention pertains to an improved combustion chamber construction for use in a gas turbine engine having a radially inwardly directed turbine nozzle. In engines of such type previously employed, particularly those utilizing annular combustion chambers, air was admitted through numerous openings in both inner and outer walls to mix with fuel sprayed axially into the chamber from a plurality of atomizers. Due to space limitations, a relatively short combustion chamber and a large number of atomizers were necessary to secure a sufficiently uniform fuel distribution and temperature spread in the combustor. Because of the number of atomizers, the fuel ports had to be of restricted size which made clogging thereof very likely and consequent non-uniformity of gas temperatures at the turbine inlet.

An object of this invention is to provide a combustion chamber construction and method of operation which will avoid the above and other objections by changing the pattern of air and fuel flow whereby fewer atomizers will be required to admit the same quantity of fuel, thus permitting the use of larger flow passages which are less susceptible to plugging and clogging. The reduction in number of atomizers in turn reduces the cost of the device. The novel flow pattern of fuel and air mixture prolongs the flow path and permits a more efficient air-fuel mixing to the end that gases of uniform temperatures are supplied to the turbine inlet and hot spots which reduce engine service life are avoided.

An object of this invention also is to provide a combustion chamber construction which will avoid the objections to previous structures by prolonging the fuel-air mixing and burning period to secure complete combustion and maximum release of energy in the fuel.

Another object is to provide an annular combustion chamber having a casing and liner construction with a particular air and fuel introducing arrangement which will cause a toroidal flow pattern resulting in the most intimate air and fuel mixture and a maximum residence time of the burning mixture in the combustor, the flow of air prior to entry thereof into the liner serving to assist in securing an effective liner cooling operation.

A further object is to provide an annular combustion chamber construction having an annular casing enclosing a similarly shaped liner with an air space between corresponding outer, one end, and inner walls, an inlet for air from a compressor communicating with one end of the air space and a radially inwardly directed annular turbine nozzle communicating with the liner at the adjacent end, the inner wall of the liner having air inlet means arranged to cause air entering the liner to flow into the annular combustion space with a tangential component of motion whereby a toroidal flow pattern will be established, thus increasing the length of the flow path of air and fuel droplets injected thereinto, the high degree of swirl contributed by the air inlet arrangement facilitating the flow of the products of combustion through the turbine nozzle.

A still further object of the invention is to provide the combustion chamber construction mentioned in the preceding paragraph with diffusion means in the air inlet consisting of spaced angularly arranged vanes to impart swirl to the air entering the air space which will increase the length of the heat transfer engagement of the air with the outer wall of the liner and improve the distribution of air to the air inlet openings in the liner.

Other objects and advantages of the invention will be set forth or made obvious by the following description of one form of the invention disclosed in detail in the accompanying drawings.

THE DRAWINGS

Figure 7:
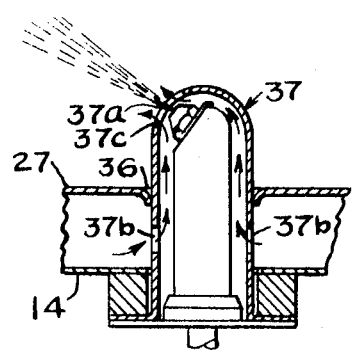
Figure 8:
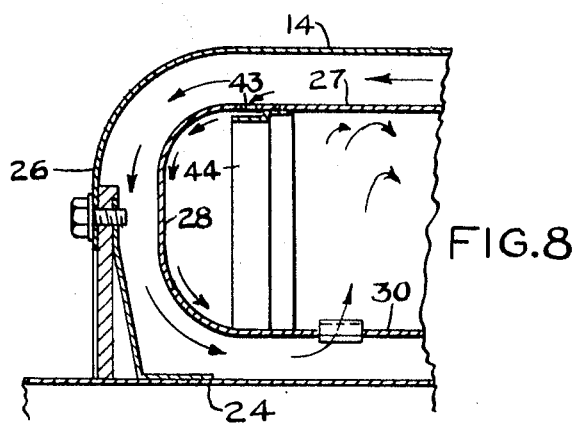

FIG. 1 is an axial sectional view of a portion of a gas turbine engine provided with a combustion chamber construction embodying the principles of the present invention;

FIGS. 2, 3, 4, 5, and 6 are enlarged fragmentary detail sectional views taken on planes indicated by broken lines II—II, III—III, IV—IV, V—V, and VI—VI, respectively, of FG. 1;

FIG. 7 is an elevational view of a fuel injection nozzle used in the structure shown in FIG. 1 to illustrate the direction of fuel flow therefrom; and FIG. 8 is a fragmentary axial sectional view of a slightly modified form of liner for a combustion chamber embodying the invention.

DESCRIPTION

More particular reference to FIG. 1 of the drawing will show that the engine selected to illustrate the invention is of the centripetal turbine type. This engine has a rotor assembly 10 including a shaft 11 journaled for rotation and having a compressor rotor 12 and turbine wheel 13 mounted thereon.

A casing 14 surrounds the rotor assembly, a portion of the casing forming an air-receiving plenum 15. The casing includes sheet metal and other parts suitably joined to form a unit. One of the parts constitutes a casting or other suitably constructed element 16 which provides an annular, radially extending passage 17 which registers with the compressor rotor outlet and constitutes the inlet leading to the air plenum 15. This passage is provided with curved or angularly arranged, spaced vanes 18 which form the diffuser of the compressor. Due to the speed of the compressor rotor and the curvature of the vanes 18, the air flowing through the passage 17 and entering the plenum 15 has a swirling motion which continues as the air is directed rearwardly by the outer wall of the casing 14.

The casing includes a second casting or other suitably formed tubular element 20 having a flaring portion 21, which, together with a ring 22 spaced therefrom by spaced angularly arranged vanes 23, forms a turbine nozzle 23a in radial registration with the blades 13a of the turbine wheel 13. A suitable exhaust duct 24 is secured to the outer end of the tubular element 20 to conduct spent gases from the turbine wheel.

The plenum 15 receives a liner 25 which is supported in spaced relation from certain walls of the casing to provide an air passage, such passage extending from the inlet 17 axially along the outer wall of the casing, radially inwardly at the rear end wall 26 of the casing, and forwardly along the exhaust duct 24 and tube 20. The liner 25 includes an outer wall 27, a rear end wall 28, and an inner wall 30, the latter having a frusto-conical extension 31 at its forward end. This end connects with the flared end of the element 20 to form the outlet leading from the liner. The liner is of annular shape with the outlet at the forward end adjacent the air inlet of the plenum 15 and communicating with the nozzle 23a.

Figure 4:
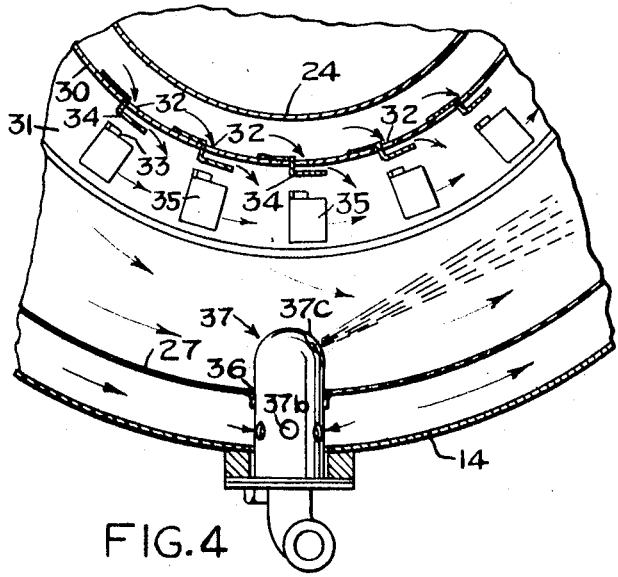
Figure 6:
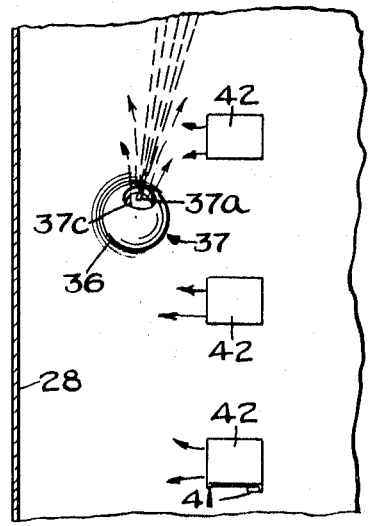
Figure 5:
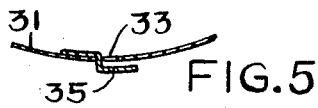

As shown in FIGS. 1 and 4, the inner wall 30 of the liner has a plurality of circumferentially spaced openings 32 formed therein. These openings constitute the inlets for the major part of the air used for combustion purposes. Other openings 33, for a purpose to be set forth hereinafter, are formed in the frusto-conical portion of the inner wall. Deflector clip elements 34 and 35 are secured to the liner wall adjacent the openings, which, in the form of the invention illustrated, are slot through which the deflector clips extend. The clips are somewhat Z-shaped, that is, part of each clip is offset relative to the other part. This permits one part of the clip to be secured to the outer surface of the wall, the clip then extending through the slot and having the other part of the clip disposed at the inner side of the wall, the connecting sections of the clips being of sufficient length to space the inner part from the inner surface of the wall. This arrangement provides deflectors in substantially parallel relation to the wall at the openings so that air entering the openings will be directed along the wall in a substantially tangent direction and around the interior of the annular liner. Since the air will be moving relatively rapidly and have a swirling component of motion, it will flow through the openings 32 and 33, be deflected by the clips, and continue in a circular direction and outwardly in the liner in a toroidal pattern.

At certain points the outer wall 27 of the liner has additional openings 36 in which fuel jet nozzles 37 are suitably supported. As mentioned previously, the flow pattern secured by the arrangement of air inlet openings and deflectors permits the use of a minimum number of fuel nozzles. These nozzles are also arranged to direct fuel spray issuing therefrom in the same direction as the air flows in the liner, i.e., circularly around the inside of the liner and generally toward the outlet end. This spray will be intimately mixed with the air due to the toroidal flow pattern thereof. The outer wall is also provided at at least one point with another opening 38 to support an igniter 40. Current supplied to this element will cause a spark to initiate combustion of the fuel-air mixture, after which the fuel will burn with a self-sustaining flame. The fuel nozzles 37 selected for the subject combustor are of the air-assist type to provide flame stability. Such nozzles each have an inner body provided with a spray orifice 37a and an outer body with inlet ports 37b to receive air from the passage 15. An air outlet 37c surrounds the spray orifice 37a and supplies air to the fuel particles as they issue from the orifice. The size and shape of the orifice are such that a spray cone with a relatively narrow angle is produced which will cause flame from each nozzle to reach or overlap the next succeeding nozzle, thus insuring the self-sustaining flame characteristic of the combustor even when operating under a turned down condition. This feature also assists in reducing the number of fuel nozzles required.

As the burning gases approach the outlet and turbine nozzle, air from openings 33 flowing generally outwardly across the toroidal path mixes with the gases in a cooling function to prevent the nozzle vanes from being excessively heated.

The outer wall 27 may be provided with a row of additional openings 41 to admit cooling air. Suitable deflector clips 42 are attached to the outer wall to direct air entering the openings 41 along the surface of wall 27 and toward the rear wall 28 of the liner. This air will tend to follow the wall and absorb heat therefrom. As shown in FIG. 8, cooling air could be admitted through openings 43 and directed rearwardly and inwardly along the end wall by an annular skirt 44 suitably provided in the liner.

In the operation of the engine provided with the combustion chamber construction forming the present invention, rotation of the shaft 11 will cause the compressor rotor to discharge air into the passage 17. This air will be diffused by the vanes 18 and will flow into the plenum 15. This air will flow with a swirling motion through the passage between the outer side of the liner and the casing and continue to flow radially inwardly between the liner end wall 28 and casing wall 26 to the space between the liner and the tubes forming the exhaust passage. The air will enter the liner through openings 32 and set up the toroidal flow pattern. Fuel supplied under pressure to the jet nozzles 37 will issue in an atomized spray and combine with the air to produce a combustible mixture which will initially be ignited by the element 40. After the flame has become sufficently well established, the element 40 can be de-energized.

The gases of combustion flow forwardly in the combustion chamber, while the toroidal flow pattern is maintained, and finally flow radially inwardly through the turbine nozzle to impinge on the blades of the turbine wheel 13 to effect rotary movement of the rotor assembly. It will be noted that the angular arrangement of the nozzle vanes 23 conform to the toroidal flow pattern. Gases leaving the turbine wheel exhaust through duct 24.

It will be apparent from the foregoing that, due to the entrance of the air to the combustion chamber from the inner wall thereof in a tangential direction, an elongated flow path of the air and fuel supplied thereto will be secured. In addition, the angular arrangement of the openings 33 and deflector clips adjacent thereto will effect a cooling of the burning air-fuel mixture without appreciably interrupting the toroidal flow pattern.

While the invention has been shown in but a single embodiment, it is obvious that many minor changes may be made without departing from the concept as set forth in the following claims.

I claim:

1. A combustion chamber construction for a gas turbine engine having a rotor axis, comprising:
   (a) casing means forming an annular plenum with an annular air inlet at one end directed radially with respect to said rotor axis;
   (m) means forming a turbine nozzle structure adjacent said inlet;
   (c) liner means in said plenum having inner and outer walls spaced from said casing to form an axially extending air passage around the liner means, said liner means providing an annular axially extending combustion chamber with an annular outlet connected with said turbine nozzle, said liner means having air inlet openings in the inner wall thereof arranged to cause the flow of air from said air passage through the inner wall of said liner means and tangentially relative thereto to form a toroidal flow pattern in said combustion chamber; and
   (d) means for introducing fuel into said liner means for mixture and combusiton with the air, the products of combustion being discharged from said liner means through said nozzle.

2. The combustion chamber construction of claim 1 in which the liner means is supported in said plenum in such a manner that said air passage extends axially along the outer water of said liner means, radially inwardly at the end thereof spaced from said plenum air inlet, and axially along the inner wall of said liner means to the air inlet openings in said inner wall.

3. The combination chamber construction of claim 2 in which the air inlet openings in the liner means are arranged in at least one row extending annularly around said liner.

4. The combustion chamber construction of claim 3 in which the air inlet openings are slots and air deflectors are disposed adjacent the slots to direct the air flowing therethrough substantially tangentially to the inner wall of the liner means to form a toroidal flow pattern in the combustion chamber.

5. The combustion chamber construction of claim 2 in which the inlet of the plenum is provided with diffuser vanes to cause air entering the plenum to swirl in said air passage.

6. The combustion chamber construction of claim 1 in which the fuel introducing means includes fuel spray nozzles supported in the outer wall of said liner means.

7. The combustion chamber construction of claim 6 in which said fuel spray nozzles are oriented to discharge fuel substantially tangentially in said combustion chamber.

8. The combustion chamber construction of claim 1 in which the liner means is provided with a plurality of relatively restricted air inlet openings in the outer wall disposed to cause the flow of air from said air passage into said combustion chamber and toward the end opposite the annular outlet to prevent excessive heating of adjacent walls.

9. The combustion chamber construction of claim 2 in which the air inlet openings in the liner means are arranged in a plurality of rows extending annularly around the liner means in the inner wall and deflectors are disposed adjacent the openings to cause the air entering to flow substantially tangentially to the inner wall to form a toroidal flow pattern in the combustion chamber.

10. The combustion chamber construction of claim 2 in which a portion of the inner wall of the liner means is of frusto-conical form and a row of air inlet openings is provided therein, the latter air inlet openings being disposed to direct air flowing therethrough across the toroidal path in a circular direction.

11. The combustion chamber construction of claim 10 in which deflectors are disposed adjacent the air inlet openings in the frusto-conical portion of the inner wall of the liner means to direct air flowing through such openings tangentially of such wall and across the toroidal flow path of the burning gases.

12. The combustion chamber construction of claim 2 in which the turbine nozzle structure includes a series of vanes oriented relative to the air inlet openings in said liner means in a manner to cause the flow through the nozzle to conform to the direction of toroidal flow in the combustion chamber.

References Cited

UNITED STATES PATENTS

| | | | |
|---|---|---|---|
| 2,748,568 | 6/1956 | Budworth | 60—39.74 |
| 2,855,754 | 10/1958 | Giannotti | 60—39.65 |
| 2,856,755 | 10/1958 | Szydlowski | 60—39.36 |
| 2,945,349 | 7/1960 | Ritzi | 60—39.36 |
| 3,010,281 | 11/1961 | Cervenka | 60—39.65 |
| 3,088,279 | 5/1963 | Diedrich | 60—39.65 |
| 3,333,414 | 8/1967 | Saintsbury | 60—39.65 |

FOREIGN PATENTS

| | | | |
|---|---|---|---|
| 756,413 | 9/1956 | Great Britain | 60—39.36 |

DOUGLAS HART, Primary Examiner

U.S. Cl. X.R.

60—39.65, 39.74 R